United States Patent
Cruise et al.

[11] Patent Number: 5,921,568
[45] Date of Patent: *Jul. 13, 1999

[54] FRONT SUSPENSION SYSTEM WITH SUBSTANTIALLY HORIZONTAL SHOCK ABSORBER

[75] Inventors: Phillip D. Cruise, Royal Oak; Delbert D. DeRees, Romeo; Thomas S. Moore, Northville, all of Mich.

[73] Assignee: Chrysler Corporation, Auburn Hills, Mich.

[ * ] Notice: This patent is subject to a terminal disclaimer.

[21] Appl. No.: 08/922,121

[22] Filed: Aug. 28, 1997

Related U.S. Application Data

[63] Continuation-in-part of application No. 08/549,413, Oct. 27, 1995, abandoned.

[51] Int. Cl.⁶ .............. B60G 3/06; B60G 7/02; B60G 11/23; B60G 15/06
[52] U.S. Cl. .............. 280/124.134; 280/124.167; 280/124.169; 267/279
[58] Field of Search .............. 280/124.134, 124.135, 280/124.136, 124.137, 124.167, 124.169, 124.166; 267/279, 280, 281, 273, 219

[56] References Cited

U.S. PATENT DOCUMENTS

| | | | |
|---|---|---|---|
| 2,148,029 | 2/1939 | Matthews | 267/273 |
| 2,226,406 | 12/1940 | Krotz | 280/124.136 |
| 2,260,634 | 10/1941 | Mullner . | |
| 2,286,609 | 6/1942 | Ledwinka . | |
| 2,409,500 | 10/1946 | Krotz . | |
| 2,450,506 | 10/1948 | Flogaus . | |
| 2,684,845 | 7/1954 | Moulton | 267/279 |
| 2,804,732 | 9/1957 | Brockley . | |
| 2,815,961 | 12/1957 | Brueder . | |
| 3,006,627 | 10/1961 | Paulsen | 267/280 |
| 3,331,627 | 7/1967 | Schroder et al. . | |
| 3,371,940 | 3/1968 | Sinclair et al. . | |
| 3,402,940 | 9/1968 | De Coye de Castelet . | |
| 3,436,069 | 4/1969 | Henschen . | |
| 3,545,737 | 12/1970 | Lamprey et al. . | |
| 3,779,576 | 12/1973 | Malcolm . | |
| 4,043,417 | 8/1977 | Orpana . | |
| 4,473,238 | 9/1984 | Antoine . | |
| 4,580,808 | 4/1986 | Smith-Williams . | |
| 4,625,995 | 12/1986 | Aubry et al. . | |
| 4,707,020 | 11/1987 | Enokida et al. . | |
| 4,830,396 | 5/1989 | Gandiglio . | |
| 5,009,463 | 4/1991 | Saitoh et al. . | |
| 5,080,389 | 1/1992 | Kawano et al. . | |
| 5,108,126 | 4/1992 | Banse | 280/124.136 |
| 5,411,285 | 5/1995 | Lee . | |
| 5,558,361 | 9/1996 | Shin | 280/124.134 |
| 5,758,896 | 6/1998 | Cruise | 280/124.167 |
| 5,816,606 | 10/1998 | Cruise et al. | 280/124.169 |

FOREIGN PATENT DOCUMENTS

| | | |
|---|---|---|
| 628328 | 8/1949 | United Kingdom . |
| 628330 | 8/1949 | United Kingdom . |
| 1237615 | 6/1971 | United Kingdom . |
| 2207975 | 2/1989 | United Kingdom . |

*Primary Examiner*—Peter C. English
*Attorney, Agent, or Firm*—Jennifer M. Stec

[57] ABSTRACT

An automobile includes a plastic body and a steel frame bonded to the plastic body. The front suspension system of the automobile includes a "v"-shaped control arm coupled to a front wheel. An arm shaft extends between the "v" of the control arm and is engaged with a rubber cartridge press-fit into a cartridge housing that is affixed to the frame. Thereby, motion of the control arm is attenuated. A horizontally-mounted transversely-oriented shock absorber further interconnects the control arm and frame. This shock absorber orientation avoids transferring suspension system loads to the plastic body.

7 Claims, 2 Drawing Sheets

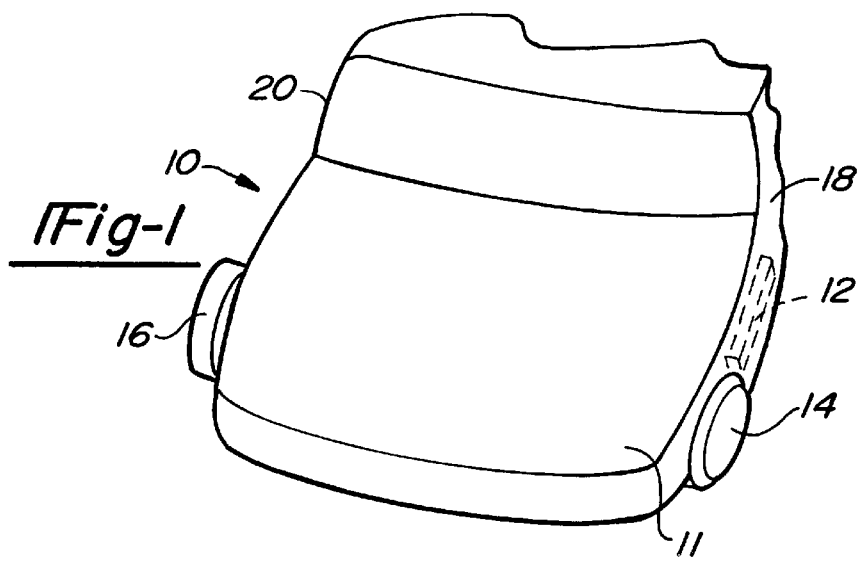
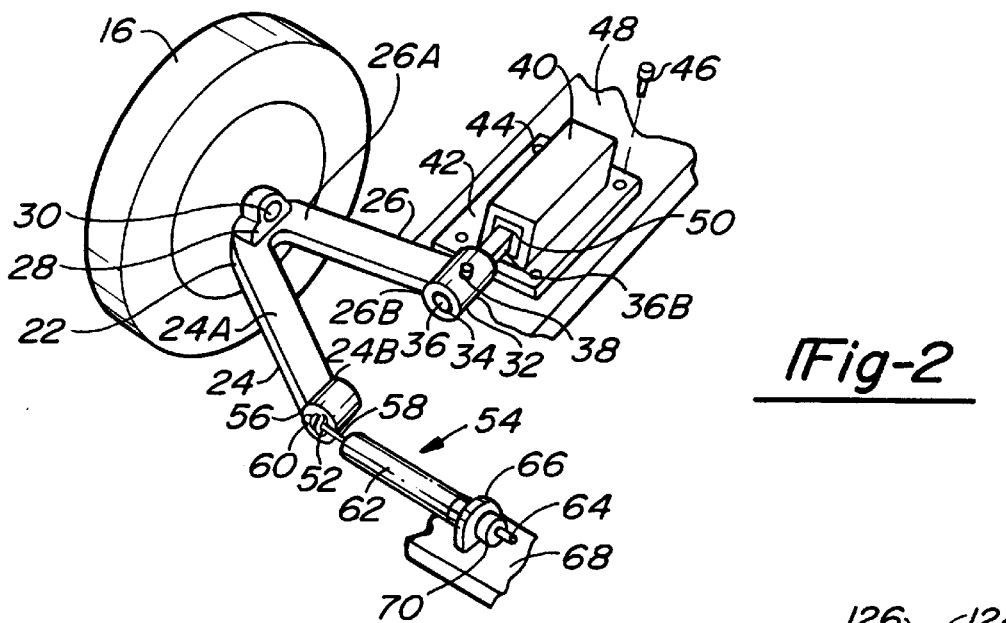
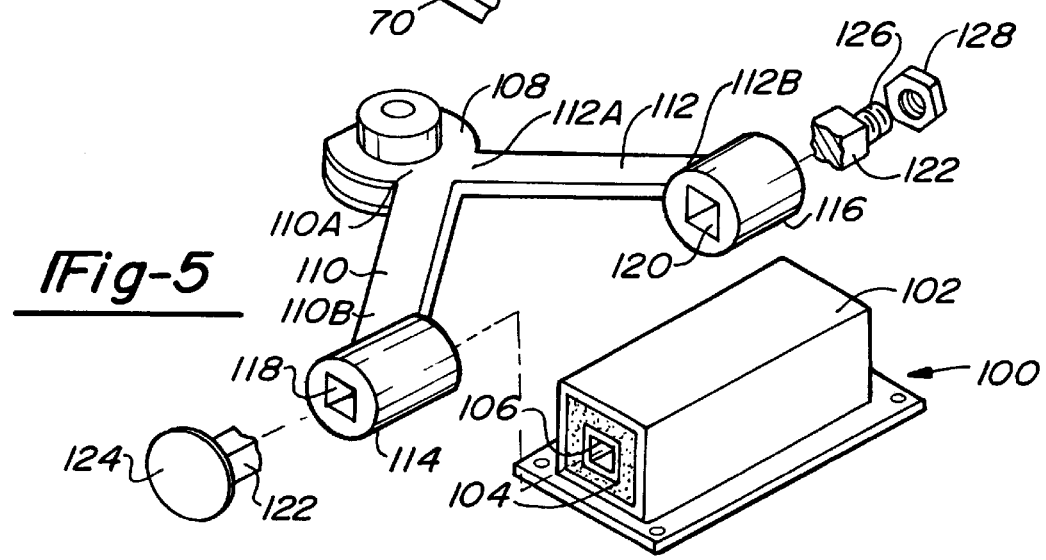

FRONT SUSPENSION SYSTEM WITH SUBSTANTIALLY HORIZONTAL SHOCK ABSORBER

CROSS-REFERENCE TO RELATED APPLICATIONS

This application is a continuation-in-part of U.S. patent application Ser. No. 08/549,413, filed Oct. 27, 1995, abandoned.

This application is related to U.S. patent application Ser. No. 08/540,297, for an invention entitled "Motor Vehicle Body", incorporated herein by reference.

FIELD OF THE INVENTION

The present invention relates generally to vehicle suspension systems, and more particularly to suspension systems for lightweight motor vehicles.

BACKGROUND OF THE INVENTION

As is well known, consumers demand a choice between many different models of automobiles. Depending on the circumstances, some consumers might desire a simple yet effective automobile, with the principal and indeed overriding consideration being cost. With this in mind, the present invention recognizes that it is possible to provide an effective and useful automobile, the cost of which can be minimized by minimizing the weight of the automobile and by using the novel structure disclosed herein.

More specifically, the present invention recognizes that a useful, low-cost, lightweight automobile can be provided which has a molded plastic body consisting essentially of a unitarily molded left half side bonded to a unitarily molded right half side. It will readily be appreciated that a molded plastic body is both lightweight, compared to metal automobile bodies, and inexpensive, compared to, e.g., fiberglass automobile bodies.

As further recognized by the present invention, by making an automobile body of lightweight molded plastic, weight bearing components such as suspension springs can be simplified vis-a-vis weight bearing components of heavier steel-bodied automobiles. Consequently, the overall cost of the lightweight automobile can be even further reduced relative to heavier automobiles.

It happens, however, that as recognized herein, in making an automobile body of plastic, additional changes beyond simplification must be made to the automobile suspension system relative to existing suspension systems. For instance, in existing automobile suspension systems, elongated shock absorbers are mounted vertically between the suspension springs and the body of the automobile, with the body thus providing load support for the shock absorbers. The present invention recognizes that plastic automobile bodies unfortunately cannot easily provide sufficient load support for shock absorbers.

Indeed, as recognized herein the load of the shock absorbers on the plastic body, were the shock absorbers to be connected directly to the body, could crack and otherwise damage the body. Simply reinforcing the plastic body to support the shock absorber load would tend to undesirably increase the cost of the automobile and would not necessarily be effective in preventing body damage over prolonged automobile use. Accordingly, it is one intent of the present invention to support suspension system shock absorbers with structure other than the automobile body.

It is therefore an object of the present invention to provide a suspension system for a lightweight automobile that incorporates a relatively simple design. Another object of the present invention is to provide a suspension system for a lightweight automobile that is effective in stabilizing the automobile. Still another object of the present invention is to provide a suspension system for a lightweight automobile in which shock absorbers are not connected directly to the body of the automobile. Yet another object of the present invention is to provide a suspension system for a lightweight automobile that is easy to use and cost-effective to manufacture.

SUMMARY OF THE INVENTION

A suspension system for an automobile which includes a front wheel and a plastic body attached to a steel frame is disclosed. The suspension system of the present invention includes a control arm that is coupled to the wheel and a shock absorber having a first end connected to the control arm and a second end connected to the frame. Per the present invention, the shock absorber is oriented substantially horizontally relative to the ground. Preferably, the shock absorber is oriented substantially transversely with respect to the vehicle.

In the preferred embodiment, the control arm has a forward leg and a rear leg coupled to the wheel. In this embodiment, the suspension system further includes a rigid hollow cartridge housing connected to the frame, and a resilient cartridge is press fit into the cartridge housing. Additionally, an arm shaft is connected to the control arm near the shock absorber, and the arm shaft is engaged with the resilient cartridge to substantially impede relative motion therebetween. Thereby, rotational motion of the arm shaft relative to the cartridge is attenuated.

In another aspect of the present invention, an apparatus includes an automobile which in turn includes a plastic molded body, a front wheel, and a frame. The apparatus further includes a suspension system coupling the front wheel to the frame. As envisioned by the present invention, the suspension system includes a substantially horizontally disposed shock absorber coupled to the front wheel and connected directly to the frame.

In yet another aspect of the present invention, a method of coupling a frame of an automobile to a front wheel of the automobile includes coupling an outboard end of a shock absorber to the front wheel. Moreover, the method includes orienting the shock absorber substantially horizontally, and directly attaching an inboard end of the shock absorber to the frame.

A suspension system for a motor vehicle having a frame and a front wheel includes a rigid hollow cartridge housing connected to the frame. A resilient cartridge is disposed in the cartridge housing, and a rigid control arm couples the front wheel to the cartridge.

In accordance with the present invention, the control arm includes front and rear legs, with each leg defining a respective outboard end and a respective inboard end. The outboard end of each leg is coupled to the front wheel. In contrast, the inboard end of the front leg is distanced from the inboard end of the rear leg. An arm shaft extends through the inboard ends of the legs and is engaged with the resilient cartridge intermediate the legs. This combination of structure impedes relative motion between the arm shaft and resilient cartridge, thereby attenuating rotational motion of the arm shaft relative to the cartridge.

In a preferred embodiment, the control arm is "v"-shaped, and the resilient cartridge is made of rubber and is press fit into the cartridge housing. Further, the arm shaft is splined to each leg of the control arm. In a particularly preferred embodiment, an arm shaft sleeve is bonded to the resilient cartridge by vulcanization, and the arm shaft mates with the arm shaft sleeve.

In another aspect of the present invention, an apparatus includes an automobile which in turn includes a plastic molded body, a front wheel, and a frame. The apparatus also includes a suspension system that couples the front wheel to the frame. Per the present invention, the suspension system includes a resilient non-metallic torque absorbing member and a rigid control arm coupling the torque absorbing member to the front wheel. The opposite front wheel is likewise coupled, via an independent control arm, to a second non-metallic torque absorbing member.

In yet another aspect of the present invention, a method for coupling a frame of an automobile to a front wheel of the automobile includes connecting a rigid hollow cartridge housing to the frame, and disposing a resilient cartridge in the cartridge housing. Further, the method includes coupling a rear leg and a front leg of a rigid v-shaped control arm to the front wheel. The method additionally contemplates coupling an arm shaft to the control arm between the legs thereof, and engaging the arm shaft with the resilient cartridge to impede relative motion therebetween. Thereby, rotational motion of the arm shaft relative to the cartridge is attenuated.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a perspective view of an automobile incorporating the novel suspension system of the present invention, with the frame shown in phantom and with portions broken away;

FIG. 2 is a perspective view of the right side components of the front suspension system according to a first embodiment of the present invention in engagement with the vehicle frame;

FIG. 5 is an exploded perspective view of a fourth embodiment of the front resilient cartridge spring of the present invention.

DETAILED DESCRIPTION OF THE PREFERRED EMBODIMENT

Figure 3:
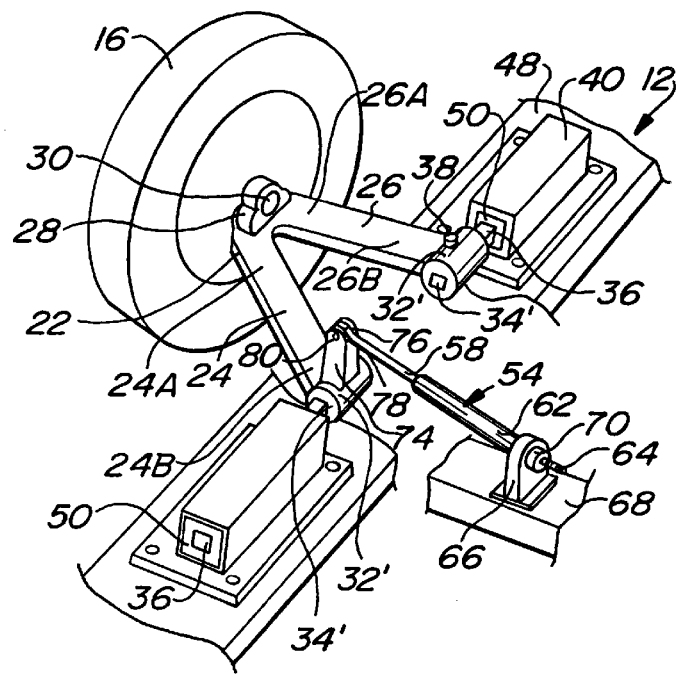
FIG. 3 is a perspective view of the right side components of the front suspension system according to a second embodiment of the present invention in engagement with the vehicle frame, with portions broken away for clarity.

Referring initially to FIG. 1, an automobile 10 is shown which includes a plastic body 11 that is attached to a steel automobile frame 12, shown in phantom in FIG. 1. As shown, the automobile 10 also includes front left and right wheels 14, 16, respectively. Preferably, the automobile body 11 is made of a plastic composite material by injection molding. In a particularly preferred embodiment, the automobile body 11 is made of fiberglass-reinforced polyethylene (PET) plastic, such as the material that is available from Hoechst-Celanese under the trade name Celstran PET-15 having 15% fiberglass by weight.

As fully disclosed in the above-referenced U.S. patent application, in the presently preferred embodiment the body 11 is made of four molded pieces. Specifically, the body 11 includes unitarily molded inner left and right panels which are bonded together. Also, the body 11 is made of unitarily molded outer left and right panels which are bonded to their respective inner panels. As intended by the present invention, the inner and outer left panels establish a relatively stiff molded left shell 18, while the inner and outer right panels establish a relatively stiff molded right shell 20,. While FIG. 1 shows a four-piece body 11, it is to be understood that the present invention may be incorporated in automobiles having plastic bodies configured differently from the body 11.

Now referring to FIG. 2, the right front wheel 16 of the automobile 10 is shown in cooperation with the frame 12. It is to be understood that the left front wheel 14 is coupled to the frame 12 in a manner substantially identical with that described below with respect to the right front wheel 16. Thus, the components of the front suspension system described below are associated with the right front wheel 16, with substantially identical components being associated with the left front wheel 14.

As shown in FIG. 2, a "v"-shaped rigid steel control arm 22 is coupled to the wheel 16 and to the frame 12, as more fully disclosed below. As intended by the present invention, the control arm 22 is "v"-shaped in that a portion of the arm 22 is shaped generally as the letter "v". It is to be understood that a control arm (not shown) which in all essential respects is identical to the control arm 22 shown in FIG. 2 couples the left front wheel 14 of the automobile 10 to the frame 12.

In the specific embodiment shown, the control arm 22 is formed with an elongated front leg 24 and an elongated rear leg 26. As used herein, orientation terms such as "front", "rear", "transverse", "longitudinal", "outboard", and "inboard" are referenced to the automobile 10.

Each leg 24, 26 shown in FIG. 2 has a respective outboard end 24a, 26a, and the outboard ends 24a, 26a are formed integrally together as shown. Furthermore, each leg 24, 26 has a respective inboard end 24b, 26b, and the inboard ends 24b, 26b are distanced from each other, consequently establishing the "v" shape of the control arm 22.

As shown in FIG. 2, the outboard ends 24a, 26a of the legs 24, 26 are coupled to the wheel 16 by means well-known in the art. For example, in one presently preferred embodiment, a ball bracket 28 including a ball 30 is formed on the control arm 22 near the outboard ends 24a, 26a, and the ball 30 is coupled to a joint (not shown) that is attached to the wheel 16 in accordance with principles well-known in the art. It is to be understood that the legs 24, 26 of the control arm 22 are configured as appropriate to avoid interference with other components of the automobile 10.

Nevertheless, it is to be understood that the control arm of the present invention, in an elemental embodiment, is a rigid, v-shaped control arm, apart from incidental configurations which may be necessary, depending on the model of the automobile 10, to clear interference with other automobile components. Thus, as intended by the present invention, the control arm 22 is different than current suspension springs, which have material resiliency so they can flex under load. In contrast, the control arm 22 substantially does not flex.

In continued reference to FIG. 2, the inboard end 26b of the rear leg 26 is formed with a hollow cylindrical shaft holder 32. As shown, the shaft holder 32 defines a channel 34 that is parallelepiped-shaped and that is oriented generally parallel to the longitudinal axis of the automobile 10. An elongated rigid steel parallelepiped-shaped arm shaft 36 is complementarily configured with the channel 34 and is closely engaged therewith. In other words, the arm shaft 36 is splined to the rear leg 26, and the arm shaft 36 preferably extends entirely through the channel 34. With this combination of structure, the arm shaft 36 cannot rotate in the channel 34. If desired, a pinch bolt 38 may be threadably engaged with the control arm 22 and rotated to urge tightly against the arm shaft 36, to further engage the arm shaft 36 with the control arm 22.

Per the embodiment shown in FIG. 2, a generally parallelepiped-shaped hollow steel cartridge housing 40 is fixedly attached to the frame 12. More particularly, a flat bottom skirt 42 of the cartridge housing 40 is formed with a plurality of holes 44 and a plurality of threaded fasteners 46 (only a single fastener 46 shown for clarity of disclosure) extend through the holes 44 and are threadably engaged with female receptacles in a longitudinal frame beam 48 of the frame 12 to hold the cartridge housing 40 onto the frame 12.

An elongated resilient rubber cartridge 50 is press-fit into the cartridge housing 40 in a close fit therewith. Additionally, the cartridge 50 can be bonded to the cartridge housing 40 by vulcanization. In accordance with the present invention, the cartridge 50 establishes a resilient non-metallic torque absorbing member. In one presently preferred embodiment, the cartridge 50 is made of a type ASTM specification M4AA624A13B13F17Z1 natural rubber made by Goodyear Tire Co.

In the embodiment shown, the cartridge 50 is square-shaped in transverse (with respect to the cartridge 50) cross-section. Accordingly, the cartridge housing 40 is formed with a square-shaped channel for closely receiving the cartridge 50 therein. It is to be understood, however, that cartridge shapes other than square may be used. For example, the transverse cross-section of the cartridge 50 can be hexagonally shaped. In a preferred embodiment, the length of the cartridge 50 is about fourteen inches (14"). Also, the width of the cartridge 50 is about three and a half inches (3.5").

To couple the wheel 16 to the cartridge 50, a solid, parallelepiped-shaped cartridge segment 36b of the arm shaft 36 extends rearwardly away from the control arm 22, and the cartridge segment 36b is embedded in and extends centrally through the cartridge 50. Effectively, the cartridge segment 36b pivotably engages the control arm 22 with the cartridge 50. To tightly bond the cartridge segment 36b of the arm shaft 36 to the cartridge 50, the cartridge segment 36b is vulcanized to the cartridge 50. In the presently preferred embodiment, the cartridge segment 36b of the arm shaft 36 has a width of about one and a half inches (1.5").

With the above disclosure in mind, it may now be appreciated that relative rotational motion between the arm shaft 36 and cartridge 50 is substantially impeded. It may be further appreciated that when the wheel 16 moves up-and-down relative to the automobile 10, as typically occurs during driving, this motion is transferred via the control arm 22 to the arm shaft 36. In turn, the cartridge segment 36b of the arm shaft 36 is urged to rotate, but owing to the vulcanized bond between the segment 36b and the resilient cartridge 50, and the material resiliency of the cartridge 50, rotational motion of the arm shaft 36 (and, hence, up-and-down motion of the control arm 22 and wheel 16) is attenuated. Still further, the rubber torsion spring of the present invention desirably dampens the transmission of road noise from the front wheels of the automobile 10 to the passenger compartment of the automobile 10. If desired, lateral movement of the control arm 22 can be limited by one or more mechanical stops (not shown). It should be recognized that the front leg 24 of control arm 22 could also be supported in a manner similar to rear leg 26.

Turning now to the front shock absorbing system of the present invention, FIG. 2 best shows that a shock bracket 52 is formed integrally with or welded to the inboard end 24b of the front leg 24. For clarity of disclosure, the bracket 52 is shown associated with the front leg 24, but it is to be understood that alternatively, the bracket 52 can be associated with the inboard end 26b of the rear leg 26.

Like the inboard end 26b of the rear leg 26, the inboard end 24b of the front leg 24 is configured as a hollow cylinder. Apart from the function disclosed below, the inboard end 24b of the front leg 24 may include a rubber bushing for engagement with other components (not shown).

An elongated, transversely-oriented (with respect to the automobile 10) pneumatic automotive shock absorber, generally designated 54, has an outboard mount 56 connected to the shock bracket 52 by means well-known in the art. In the specific embodiment shown, the outboard mount 56 of the shock absorber 54 is established by a rod 58 of the shock absorber 54, and the rod 58 extends through the bracket 52 and is threadably engaged with a nut 60 to hold the bracket 52 and rod 58 together.

Additionally, a cylinder 62 of the shock absorber 54 is reciprocatingly engaged with the rod 58. In accordance with the present invention, the cylinder 62 establishes an inboard mount of the shock absorber 54 which is directly connected to the frame 12 such that the shock absorber 54 is mounted substantially horizontally on the automobile 10. In the embodiment shown, a threaded shaft 64 extends inwardly from the cylinder 62 and through a frame bracket 66 that is fixed, as by welding, to a transverse frame beam 68 of the frame 12. The transverse frame beam 68 may be welded to the longitudinal frame beam 48. A nut 70 is engaged with the shaft 64 and is tightened against the frame bracket 66 to directly connect the shock absorber 54 to the frame 12.

Accordingly, as shown the shock absorber 54 of the present invention is not oriented substantially vertically relative to the automobile 10, nor is the shock absorber 54 connected directly to the body 11 of the automobile 10, in contrast to conventional shock absorber arrangements. Instead, the shock absorber 54 is oriented substantially transversely and horizontally relative to the automobile 10, and is connected directly to the frame 12 vice the body 11. Consequently, the force loading of the shock absorber 54 is distributed to the frame 12, and stress to the plastic body 11 induced by the suspension system of the automobile 10 is thereby avoided. Moreover, the disclosed arrangement of the shock absorber 54 absorbs side-to-side sway motion of the automobile 10.

In the embodiment shown, the shock absorber 54 is canted slightly downwardly from its outboard mount to its inboard mount to avoid interference with other components of the automobile 10. It is to be understood that other slight variations in the orientation of the shock absorber 54 may be effected to avoid interference. Nonetheless, the shock absorber 54 of the present invention is mounted substantially transverse relative to the automobile 10, and is connected to the frame 12. In one presently preferred embodiment, the shock absorber 54 is a type X68560 Monroe shock absorber.

With reference to FIG. 3 a second embodiment of the present invention is shown wherein like reference numerals designate common elements as shown and described in connection with FIG. 2. As shown in FIG. 3, the inboard ends 24b, 26b of the front and rear legs 24, 26 are each formed with a hollow shaft holder 32'. As shown, the shaft holders 32' each define a parallelepiped-shaped channel 34' that is oriented generally parallel to the longitudinal axis of the automobile 10. A pair of elongated rigid parallelepiped-shaped arm shafts 36 are received within each of the channels 34' and are closely engaged therewith. A pinch bolt 38 may be threadably engaged with the inboard ends 24b, 26b and rotated to urge tightly against the respective arm shafts 36. The elongated rigid arm shafts 36 are supported on a second end by a pair of generally parallelepiped-shaped hollow steel cartridge housings 40 mounted to the vehicle frame 12. The steel cartridge housings 40 each include an elongated resilient rubber cartridge 50 which are mounted to the frame 12 as shown and described with reference to the housing 40 and cartridge 50 shown in FIG. 2.

Turning now to the shock absorbing system of the present invention, FIG. 3 shows that an arm 74 is formed integrally with or welded to the inboard end 24b of the front leg 24. Arm 74 extends generally vertically upward from the inboard end 24b of the front leg 24. The arm 74 which extends vertically upward from the inboard end 24b of front leg 24 is connected to an elongated, transversely-oriented pneumatic automotive shock absorber, generally designated 54. The shock absorber 54 includes a rod 58 having a bushing 76 mounted in mounting flanges 78 on the end of arm 74. As shown, the bushing 76 on the end of rod 58 is fastened to the mounting flanges 78 by a pin 80. It should be understood that other known methods of attachment may be used.

A cylinder 62 of the shock absorber 54 is reciprocatingly engaged with the rod 58. In accordance with the present invention, the cylinder 62 establishes an inboard mount of the shock absorber 54 which is directly connected to the frame 12 such that the shock absorber 54 is mounted substantially horizontally relative to the automobile 10. In the embodiment shown, a threaded shaft 64 extends inwardly from the cylinder 62 and through a frame bracket 66 that is fixed, as by welding, to a transverse frame beam 68 of the vehicle frame 12. The transverse frame beam 68 may be welded to the longitudinal frame beam 48 of the vehicle frame 12. A nut 70 is engaged with the shaft 64 and is tightened against the frame bracket 66 to directly connect the shock absorber 54 to the frame 12.

Accordingly, as shown, the shock absorber 54 of the present invention is not oriented substantially vertically relative to the automobile 10, nor is the shock absorber 54 connected directly to the body 11 of the automobile 10, in contrast to conventional shock absorber arrangements. Instead, the shock absorber 54 is oriented substantially transversely and horizontally relative to the automobile 10, and is connected directly to the frame 12. Consequently, the force loading of the shock absorber 54 is distributed to the vehicle frame 12, and stress to the plastic body 11 induced by the suspension system of the automobile 10 is thereby avoided. Moreover, the disclosed arrangement of the shock absorber 54 absorbs side-to-side sway motion of the automobile 10. In the embodiment shown, the shock absorber 54 is canted slightly downwardly from its outboard mount to its inboard mount to avoid interference with other components of the automobile 10. It is to be understood that other slight variations in the orientation of the shock absorber 54 may be effected to avoid interference. Nonetheless, the shock absorber 54 of the present invention is mounted substantially transverse relative to the automobile 10, and is connected to the vehicle frame 12.

In the system, as disclosed in FIG. 3, a spring and damper-type shock absorber system is provided. In particular, the resilient cartridges 50 act like a spring system while the shock absorber 54 provides a damper system.

Figure 4:
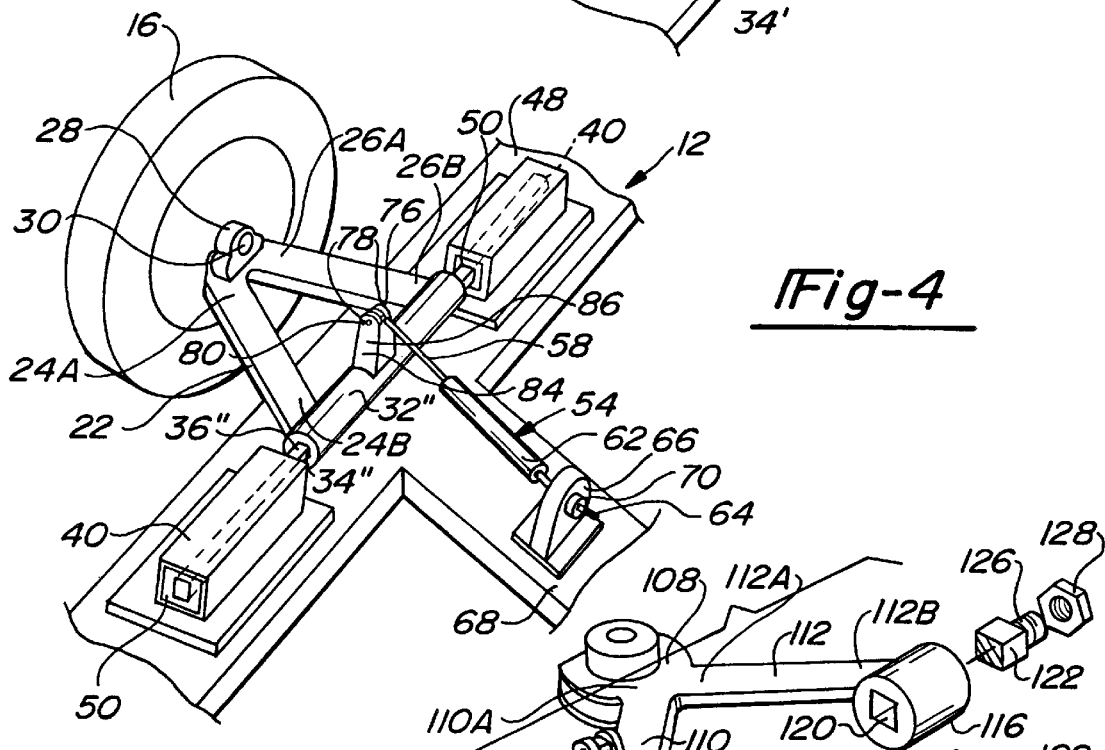
FIG. 4 is a perspective view of the right side components of the front suspension system according to a third embodiment of the present invention in engagement with the vehicle frame.

According to a third embodiment of the present invention, the inboard ends 26b, 24b of the rear and front legs 26, 24 of control arm 22 can be attached to one another by a hollow cylindrical shaft holder 32" which defines a parallelepiped-shaped channel 34", as shown in FIG. 4. The channel 34" receives a parallelepiped-shaped arm shaft 36" which has end portions received in housing 40 which also include an elongated resilient cartridge 50 as shown and described above. According to this embodiment, generally vertical arm 84 is integrally formed with or welded to the shaft holder 32". A shock absorber 54 is attached to the upper end portion 86 of arm 84 while a second end of the shock absorber 54 is mounted to the vehicle frame 12 in the same manner as the shock absorber 54 as discussed with reference to FIG. 3 above.

FIG. 5 shows an alternate embodiment of the rubber torsion front spring of the present invention, generally designated 100. As shown, the spring 100 includes a rigid hollow parallelepiped-shaped steel cartridge housing 102 that is connected to the frame of an automobile in accordance with principles disclosed above.

A resilient rubber cartridge 104 is press fit in the cartridge housing 102, also in accordance with principles disclosed above. Additionally, a hollow steel arm shaft sleeve 106 is centrally disposed in the cartridge 104 and is bonded to the cartridge 104 by vulcanization. Thus, the cartridge 104 is sandwiched between the cartridge housing 102 and sleeve 106. It should be understood that the sleeve 106 could also be utilized in the embodiments disclosed in FIGS. 2–4 discussed above.

The alternate embodiment shown in FIG. 5 also includes a rigid steel v-shaped control arm 108. Like the control arm 22 shown in FIG. 3, the control arm 108 shown in FIG. 5 includes front and rear legs 110, 112. Each leg 110, 112 defines a respective outboard end 110a, 112a, with the outboard end of each leg 110, 112 being coupled to a front wheel of an automobile (not shown in FIG. 5) by means well-known in the art. Each leg 110, 112 shown in FIG. 5 also defines a respective inboard end 110b, 112b. As shown, the inboard end 110b of the front leg 110 is distanced from the inboard end 112b of the rear leg 112.

Similarly to the embodiments shown in FIGS. 3 and 4, each inboard end 110b, 112b of the control arm 108 shown in FIG. 5 is formed with a respective hollow cylindrical shaft holder 114, 116. As shown, each shaft holder 114, 116 defines a respective channel 118, 120 that is parallelepiped-shaped. It can be readily appreciated in reference to FIG. 5 that the cartridge housing 102 is disposed between the shaft holders 114, 116, with the channels 118, 120 of the shaft holders 114, 116 being coaxial with the arm shaft sleeve 106.

An elongated rigid steel parallelepiped-shaped arm shaft 122 is complementarily configured with the channels 118, 120 and the arm shaft sleeve 106 in close engagement therewith. In other words, the arm shaft 122 is splined to the front and rear legs 110, 112, and is engaged with the cartridge 104 via the arm shaft sleeve 106. Thus, the arm shaft 122 mates with the arm shaft sleeve 106, and consequently cannot rotate therein. Preferably, the arm shaft 122 extends entirely through the channels 118, 120.

Accordingly, the arm shaft 122 is engaged with the resilient cartridge 104 intermediate the legs 110, 112 to impede relative motion between the arm shaft 122 and resilient cartridge 104. Thereby, rotational motion of the arm shaft 122 relative to the cartridge 104 is attenuated.

To hold the arm shaft 122 in engagement with the legs 110, 112 and sleeve 106, the arm shaft 122 is formed with an enlarged head 124 which abuts the shaft holder 114 of the front leg 110. Also, the arm shaft 122 is formed with a threaded rear extension 126 which extends rearwardly beyond the shaft holder 116 of the rear leg 112. A nut 128 is threadably engaged with the extension 126 to thereby hold the arm shaft 122 in engagement with the legs 110, 112 and sleeve 106.

Figure 6:
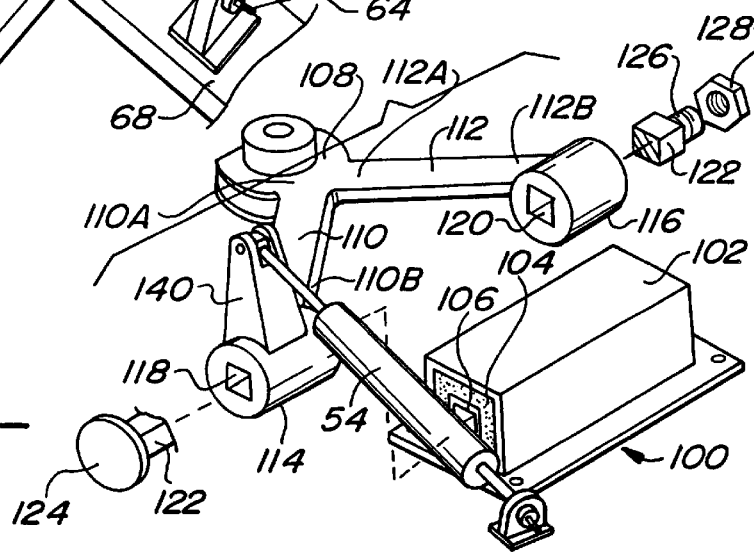
FIG. 6 is an exploded perspective view of a fifth embodiment of the front suspension system according to the present invention.

FIG. 6 illustrates the use of a transversely mounted shock absorber 54 utilized in combination with the rubber torsion front spring shown in FIG. 5. In this embodiment, an arm 140 extends generally upward from the hollow cylindrical shaft holder 114. It should be recognized that the arm 140 could also be attached to the shaft holder 116 disposed on the rear leg 112. The shock absorber 54 is mounted to the arm 140 in the same manner as disclosed above, and is also attached to the vehicle frame in a generally horizontal fashion as disclosed above.

While the particular FRONT SHOCK ABSORBER FOR LIGHTWEIGHT MOTOR VEHICLE as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A suspension system for an automobile including a front wheel and a steel frame, comprising:
    a V-shaped control arm including a front leg and a rear leg coupled to the wheel, at least one of said front and rear legs including a shaft holder portion at an inboard end having a generally vertical arm extending upward therefrom;
    a shock absorber having a first end connected directly to said generally vertical arm and a second end connected to the frame, the shock absorber being oriented substantially horizontally relative to the ground, said shock absorber being oriented substantially transversely with respect to the automobile;
    a rigid hollow cartridge housing connected to the frame;
    a resilient cartridge disposed in the cartridge housing; and
    an arm shaft connected to said shaft holder portion of the control arm, the arm shaft being engaged with the resilient cartridge to substantially impede relative motion therebetween to thereby attenuate rotational motion of the arm shaft relative to the cartridge.

2. The suspension system of claim 1, wherein the resilient cartridge is press fit into the cartridge housing, and the arm shaft extends through the cartridge.

3. A suspension system for an automobile including a front wheel and a steel frame, comprising:
    a V-shaped control arm including a front leg and a rear leg coupled to the wheel, at least one of said front and rear legs including a shaft holder portion at an inboard end having a generally vertical arm extending upward therefrom;
    a rigid hollow cartridge housing connected to the frame;
    a resilient cartridge disposed in the cartridge housing;
    a parallelepiped-shaped arm shaft connected to said shaft holder portion of the control arm, the arm shaft being engaged with the resilient cartridge to substantially impede relative motion therebetween to thereby attenuate rotational motion of the arm shaft relative to the cartridge; and
    a shock absorber having a first end connected to said generally vertical arm and a second end connected to the frame, the shock absorber being oriented substantially horizontally relative to the ground.

4. The suspension system of claim 3, wherein the resilient cartridge is press fit into the cartridge housing, and the arm shaft extends through the cartridge.

5. A suspension system for a motor vehicle having a frame and a front wheel, comprising:
    a rigid hollow cartridge housing connected to the frame;
    a resilient cartridge disposed in the cartridge housing;
    a parallelepiped-shaped metal arm shaft inner sleeve bonded to an inner surface of a central opening in said resilient cartridge;
    a rigid V-shaped control arm including front and rear legs, each leg defining a respective outboard end, the outboard end of each leg being coupled to the front wheel, each leg also defining a respective inboard end each terminating in a shaft holder portion, the shaft holder portion of the front leg being distanced from the shaft holder portion of the rear leg, one of said shaft holder portions including a generally vertical arm extending upward therefrom;
    a parallelepiped-shaped arm shaft extending through parallelepiped shaped openings in the shaft holder portions of said front and rear legs, the arm shaft slidably extending into the arm shaft inner sleeve and stationarily engaged therewith to impede relative rotational motion between the arm shaft and resilient cartridge to thereby attenuate rotational motion of the arm shaft relative to the cartridge; and
    a substantially horizontally disposed shock absorber having a first end coupled to said generally vertical arm and a second end connected to the frame.

6. The suspension system of claim 5, wherein the resilient cartridge is made of rubber.

7. The suspension system of claim 5, wherein the resilient cartridge is press fit into the cartridge housing.

* * * * *